United States Patent
Difasi et al.

(10) Patent No.: US 6,257,595 B1
(45) Date of Patent: Jul. 10, 2001

(54) COLLECT CHUCK WITH QUICK-CHANGE CAP

(75) Inventors: Anthony J. Difasi, Horseheads; Donald N. Terwilliger, Elmira, both of NY (US)

(73) Assignee: Hardinge Inc., Elmira, NY (US)

( * ) Notice: Subject to any disclaimer, the term of this patent is extended or adjusted under 35 U.S.C. 154(b) by 0 days.

(21) Appl. No.: 09/389,057

(22) Filed: Sep. 2, 1999

Related U.S. Application Data

(60) Provisional application No. 60/099,317, filed on Sep. 4, 1998.

(51) Int. Cl.[7] ..................................................... B23B 21/20
(52) U.S. Cl. ............................................... 279/50; 279/57
(58) Field of Search ........................... 279/48–50, 54–57

(56) References Cited

U.S. PATENT DOCUMENTS

| | | |
|---|---|---|
| D. 271,977 | 12/1983 | Baker . |
| D. 278,245 | 4/1985 | Smith . |
| D. 278,344 | 4/1985 | Smith . |
| 2,449,887 * | 9/1948 | Edel et al. ............................. 279/49 |
| 3,026,116 * | 3/1962 | Marini, Sr. ............................. 279/48 |
| 3,727,930 * | 4/1973 | Anderson ............................. 279/50 |
| 3,961,800 | 6/1976 | Peterson et al. . |
| 4,068,545 * | 1/1978 | Scheler ................................. 82/124 |
| 4,245,846 | 1/1981 | Andrews . |
| 4,249,748 | 2/1981 | Andrews . |
| 4,309,041 | 1/1982 | Peterson et al. . |
| 4,447,180 | 5/1984 | Pesch . |
| 4,477,095 | 10/1984 | Atkinson, III . |
| 4,726,719 | 2/1988 | Mack . |
| 4,829,861 | 5/1989 | Brown et al. . |
| 4,858,938 | 8/1989 | Terwilliger et al. . |
| 4,877,259 | 10/1989 | Rohm et al. . |
| 4,932,674 | 6/1990 | Pesch et al. . |
| 5,072,954 | 12/1991 | Mack . |
| 5,087,059 | 2/1992 | Terwilliger . |
| 5,096,213 | 3/1992 | Terwilliger et al. . |
| 5,221,098 | 6/1993 | Ayzenshtok et al. . |
| 5,325,749 | 7/1994 | Peris et al. . |
| 5,330,224 | 7/1994 | Terwilliger et al. . |
| 5,397,135 | 3/1995 | Smith . |
| 5,431,419 | 7/1995 | Mack . |
| 5,489,167 | 2/1996 | Hangleiter . |
| 5,590,985 | 1/1997 | Mack . |

* cited by examiner

Primary Examiner—Steven C. Bishop
(74) Attorney, Agent, or Firm—Pillsbury Winthrop LLP

(57) ABSTRACT

A collet chuck assembly includes an annular mount adapted to be attached to a spindle of a turning machine, a tubular collet sleeve disposed internally to the mount including an inner tapered cam surface and adapted to be coupled to an axial moving mechanism of the turning machine, and a tubular collet structure dispose interiorly of the collet sleeve and having a cooperating tapered, outer cam surface. An annular retaining cap has retaining lugs adapted to be engaged with locking flanges of the mount upon engagement of the cap with the mount and rotation of the cap with respect to the mount. The installed cap engages a front end of the collet structure to retain the collet structure within the collet sleeve. A cap anti-rotation mechanism includes an anti-rotation pin carried within the mount for reciprocating axial movement with respect to the mount between extended and retracted positions and a pin actuating mechanism for selectively effecting the reciprocating axial movement. When in the extended position, the anti-rotation pin engages the cap to prevent rotation of the installed cap with respect to the mount. The cap can be rotated with respect to the mount and removed therefrom be moving the anti-rotation pin to the retracted position.

14 Claims, 6 Drawing Sheets

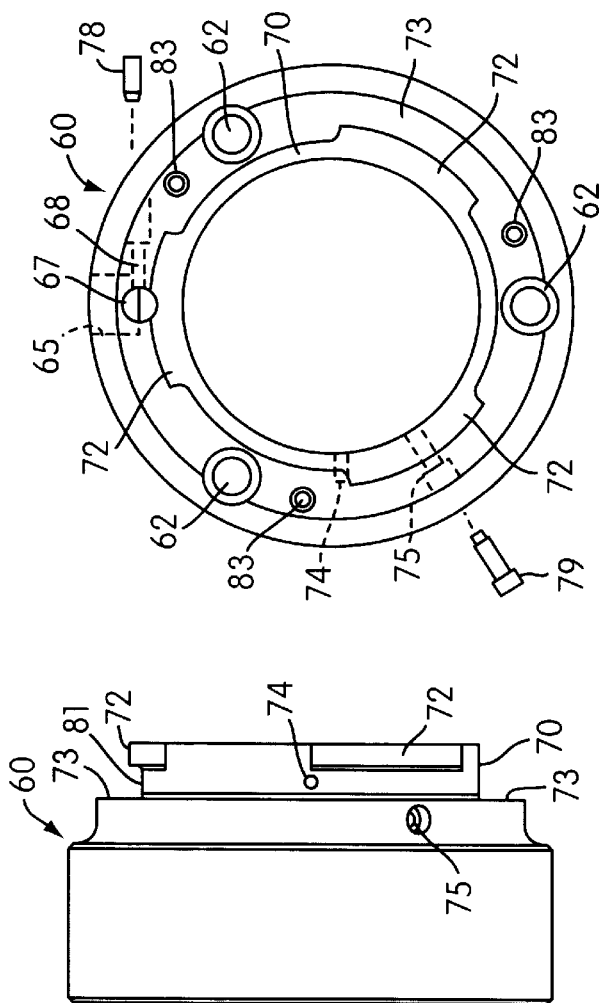
FIG. 3C
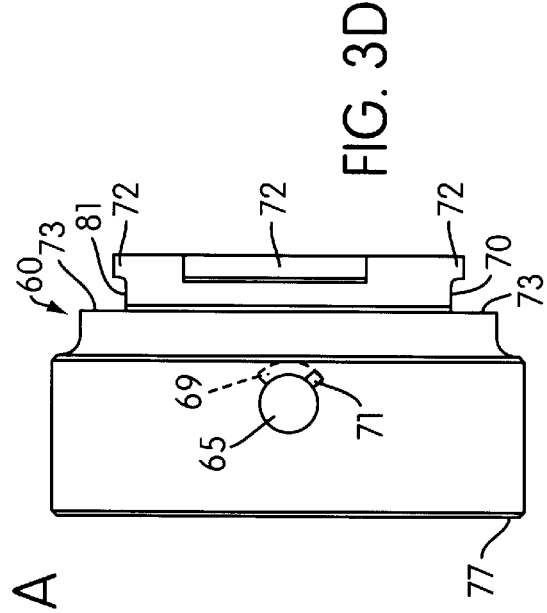
FIG. 3D
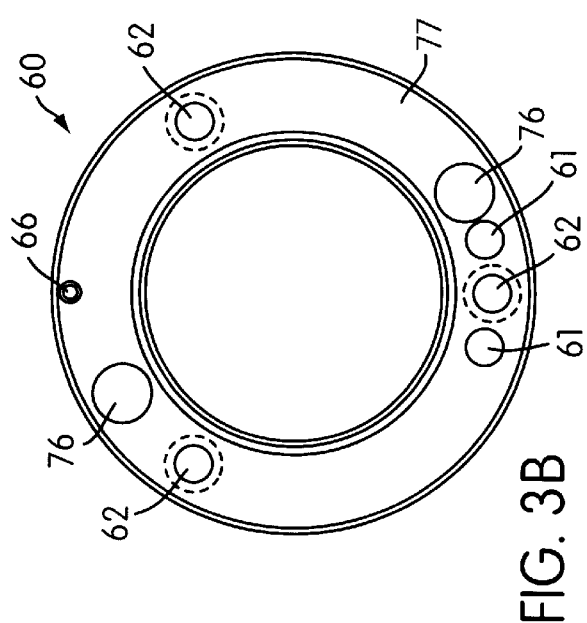
FIG. 3A
FIG. 3B
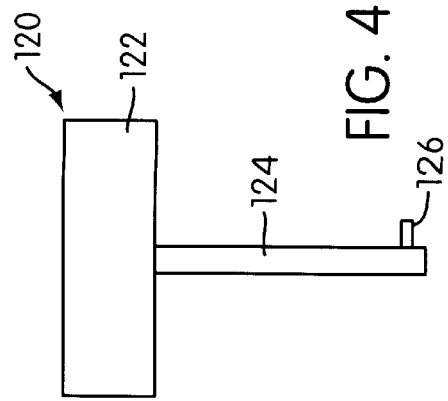
FIG. 4

COLLECT CHUCK WITH QUICK-CHANGE CAP

This application claims the benefit of U.S. Provisional Application No. 60/099,317, filed Sep. 4, 1998.

BACKGROUND OF THE INVENTION

The present invention relates generally to a collet chuck assembly for holding a tool or workpiece on a spindle of a turning machine and particularly to a collet chuck that can be changed quickly and easily.

Collets are sleeves or collars used in various machine tools such as lathes for clamping or gripping workpieces or tools. Collets include a plurality of circumferentially-spaced, workpiece-gripping segments and conical surfaces or cams, which, when the collet is moved axially, interact with corresponding, opposing surfaces or cams on a mounting fixture or on the spindle. This interaction causes the workpiece-gripping segments of the collet to contract or expand to grasp or release a workpiece or tool, depending on the direction of movement. Collet chucks have commonly been used in machine tools in place of other types of chucks. Collet chucks are typically more accurate and have a greater gripping characteristic than a typical jaw chuck, for example. An advantage of collets is that they continue to grasp the workpiece or tool even at high rotational speeds when jaw chucks would have a tendency to loosen their grip due to centrifugal force.

One problem encountered with collet chucks is that slight variations in the diameter of the workpiece or stock could cause the collet to position the workpiece differently. When and where a collet will grasp a work piece depends on the difference in diameter between the open collet and the diameter of the workpiece. Precise workpiece diameter is therefore required if the workpiece is to be positioned precisely and consistently in machining operations such as facing, side finishing or cutting to precise lengths.

Another problem encountered with conventional collet assemblies is that collet cannot be easily and quickly removed from the spindle. Accordingly, changing collets can be time consuming.

For example U.S. Pat. Nos. 5,096,213 and 5,330,224, the respective disclosures of which are hereby incorporated by reference, disclose collet chucks in which a collet body includes an annular groove and hook portion on a rear end of the body which engages an annular flange portion of a spindle of the turning machine or a drawbar adapter of the collet assembly. A collet is installed by engaging the hook portion of the collet to the flange portion of the spindle or adapter, a special tool, such as those disclosed in U.S. Pat. Nos. 4,589,938 or 5,087,059, the respective disclosures of which are hereby incorporated by reference, is needed to compress the rear portions of the collet segments a sufficient distance radially inwardly so that the hook portion of the collet clears the annular flange portion. Similarly, to remove the collet from the turning machine, the tool must again be used to compress the rear portions of the segments so that the hook portions clear the flange portions so that the collet can be disengaged.

SUMMARY OF THE INVENTION

It is an object of the present invention to overcome the forgoing disadvantages which accompany prior art collets. This object is achieved by a collet chuck assembly for holding a tool or workpiece on a spindle of a turning machine constructed in accordance with principles of the present invention. The collet chuck assembly comprises a mount, a collet assembly, and a cap.

The mount has a rear end adapted to be connected to the spindle and cap engaging structure. The collet assembly includes a collet structure for holding a tool or workpiece and operatively interacting cam surfaces. The collet assembly permits relative movement between the cam surfaces, whereby relative movement between the cam surfaces in one direction closes the collet structure to hold the tool or workpiece and relative movement between the cam surfaces in another direction opens the collet structure to release the tool or workpiece. The cap is secured to the mount and engages a front end of the collet structure to maintain the front end at a fixed axial position with respect to the cap and the mount during the relative movement between the cam surfaces of the collet assembly. The cap includes mount engaging structure adapted to coact with the cap engaging structure of the mount to prevent relative axial displacement between the cap and the mount when the cap is in a cap-locked position with respect to the mount. The cap is placed in the cap-locked position by coupling the cap to the mount with the cap-engaging structure of the mount and the mount-engaging structure of the cap disengaged from one another and then rotating the cap less than one revolution with respect to the mount to interengage the cap-engaging structure of the mount with the mount-engaging structure of the cap.

Accordingly, the collet structure does not move axially with respect to the assembly so that tools and workpieces can be gripped and positioned consistently. Furthermore, installing a collet is easily accomplished by merely inserting a collet structure into the collet assembly, engaging a cap over the collet structure onto the mount, and rotating the cap into the cap-locked position.

Other objects, features, and characteristics of the present invention, as well as the methods of operation of the invention and the function and interrelation of the elements of structure, will become more apparent upon consideration of the following description and the appended claims with reference to the accompanying drawings, all of which form a part of this disclosure, wherein like reference numerals designate corresponding parts in the various figures.

BRIEF DESCRIPTION OF THE DRAWINGS

FIGS. 3A, 3B, and 3C are a side elevation, bottom plan view, and top plan view, respectively, of a mount of the collet chuck a assembly;

FIG. 3D is a side elevation of the mount rotated 90 degrees with respect to the side elevation of FIG. 3A;

FIG. 4 is a side elevation of a rotation tool used in conjunction with the collet chuck assembly;

DETAILED DESCRIPTION OF THE PREFERRED EMBODIMENT

For convenience in the following description, various directional or other spatial references are made with regard to references to the drawings. It is understood, however, that such references, including without limitation, front, back, forward, rearward, upper, lower, top, bottom, left, right, lateral, or longitudinal, are made for convenience only and should not be construed to be limiting on the invention described herein.

Figure 1:
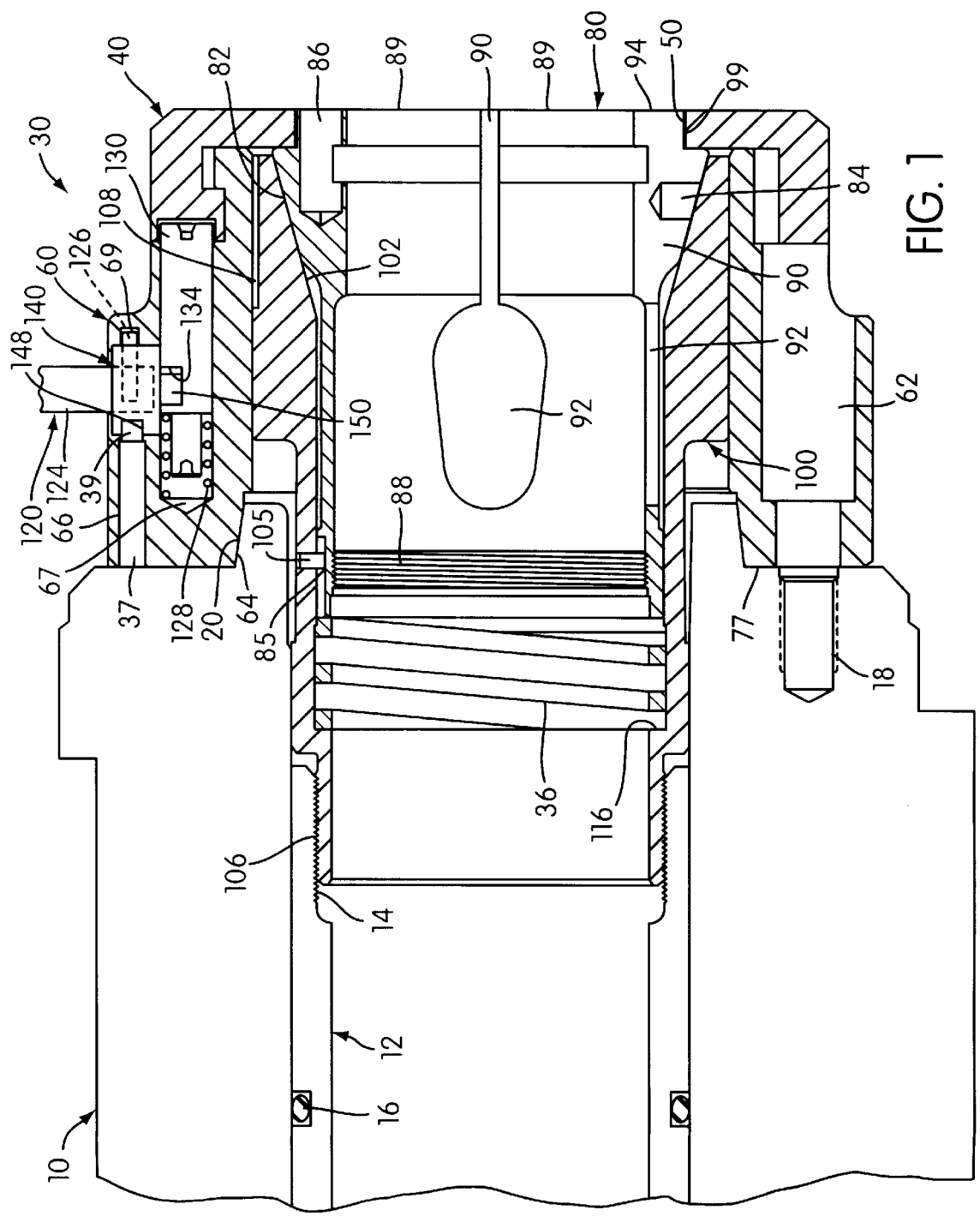
FIG. 1 is a cross-sectional view of the collet chuck assembly according to the present invention.
Figure 2:
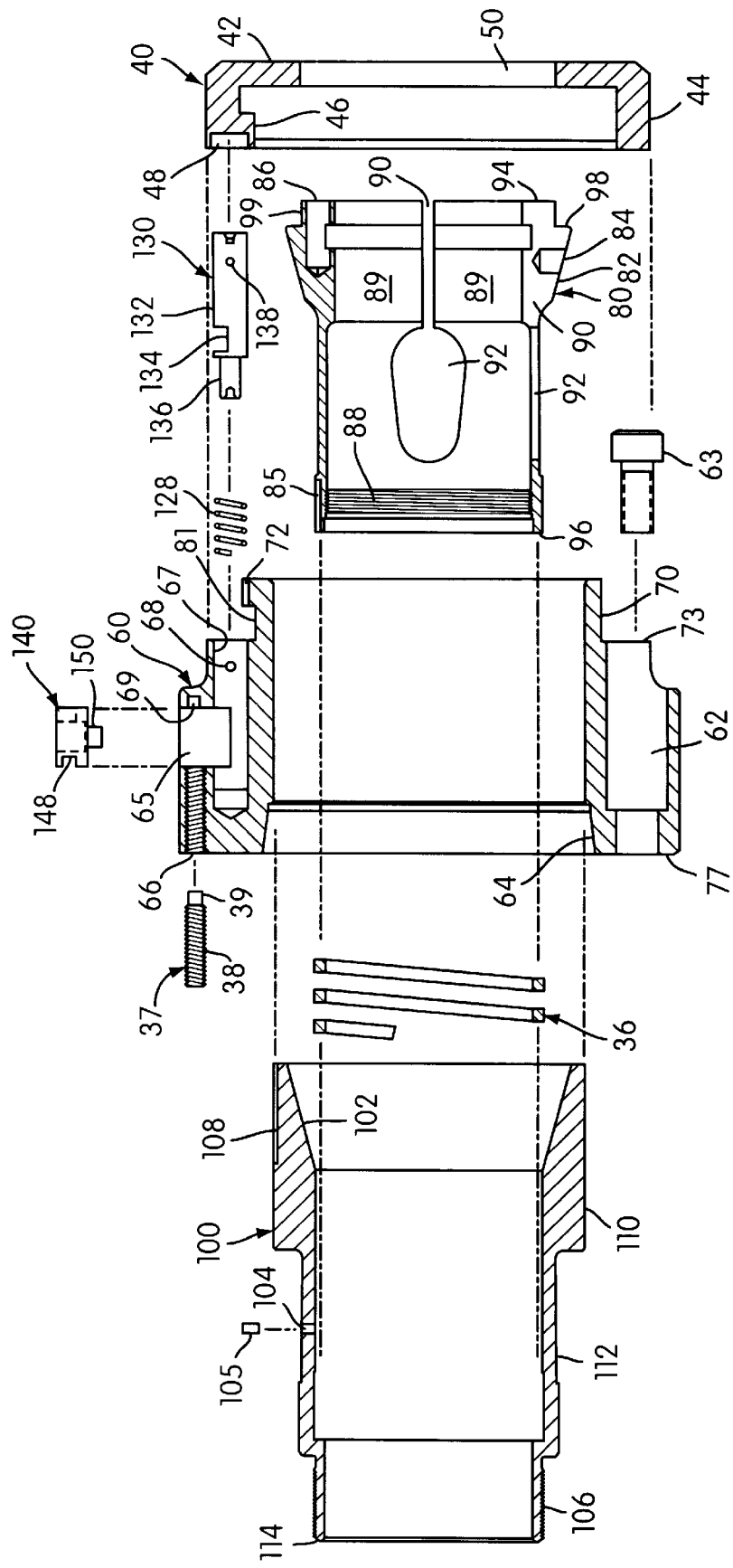
FIG. 2 is an exploded cross-sectional view of the collet chuck assembly.

A collet chuck assembly according to the present invention for holding a tool or workpiece is indicated generally by reference number 30 in FIGS. 1 and 2. The collet chuck assembly 30 is attached to a spindle 10 and draw bar 12 of a machine, for example a lathe. The collet chuck assembly 30 generally comprises a mount 60, a collet assembly which includes a collet sleeve 100, a collet 80, and a collet spring 36, and a quick-change cap 40.

An O-ring 16 may be disposed between the draw bar 12 and spindle 10 to prevent lubricants from escaping between the draw bar 12 and spindle 10 and to prevent debris from entering the draw bar 12 and spindle 10.

As shown in FIGS. 1 and 2 and FIGS. 3A–3D, the mount 60 includes equally spaced, counterboard axial through-holes 62 formed about the outer periphery of the mount 60. Mount 60 also includes an inner tapered surface 64 shown at the left side thereof in the figures, which, for convenience, will be referred to as the rear side. Surface 64 cooperates with outer tapered surface 20 of the machine spindle 10 to appropriately position the mount 60 with respect to the spindle 10, as described, for example, in U.S. Pat. No. 5,096,213, the disclosure of which is hereby incorporated by reference. Mount 60 also includes a pair of diametrically opposed blind holes 76 formed in the rear end face 77 which cooperate with a pair of mating projections (not shown) extending from the end of the spindle 10 as disclosed in the previously mentioned U.S. Pat. 5,096,213. Fasteners 63 (e.g., socket head cap screws) extend through the counterboard through-holes 62 into threaded blind apertures 18 formed in the spindle 10 to secure the mount 60 to the spindle 10.

As best shown in FIG. 2, mount 60 further includes a cam aperture 65 extending radially to an outer surface of the mount 60. An axial aperture 66 extends from rear end-face 77 of the mount 60 to the cam aperture 65. A second axial aperture 67 extends from a front annular shoulder 73 of the mount 60 opposite rear end-face 77 to a position beyond the cam aperture 65. Axial apertures 66 and 67 are radially offset and radially aligned with one another in a parallel relation. A tangential aperture 68 (see FIG. 3C) extends from a side surface of the mount 60 to the axial aperture 67. As shown in FIG. 3D, a slot 71 extends radially from the cam aperture 65 and communicates with an arcuate slot 69 formed below the outer surface of the mount 60.

To compensate for the radial imbalance caused by the removal of material for apertures 65, 66, 67, and 68 on one side of the mount 60, balance holes 61 are formed on a diametrically opposite side of the mount 60. In the illustrated embodiment, two balance holes 61 are formed, one on either side of one of the through-holes 62.

A cylindrical extension 70 extends from one end of the mount 60. Extension 70 has a diameter generally less than the remainder of the mount 60 and therefore defines the annular shoulder 73 at the base of the cylindrical extension 70. Cap-engaging structure, such as radial flanges 72, extend from the axial end of the cylindrical extension 70. In the illustrated embodiment, three such flanges 72 extend from the extension 70. In the preferred embodiment, flanges 72 are not equally spaced about the perimeter of the cylindrical extension 70. The radial flanges 72 define a peripheral channel 81 (see FIG. 3A) extending about the base of the cylindrical extension 70. A dowel pin 74 extends radially from the outer surface of the cylindrical extension 70 at a generally central portion of the peripheral channel 81 adjacent to an edge of one of the radial flanges 72.

Mount 60 is preferably machined from 8620-C steel and is hardened to Rockwell C hardness of about 61.

As shown in FIGS. 1 and 2, collet sleeve 100 is disposed radially inwardly of the mount 60 within the assembly 30. Collet sleeve 100 includes an enlarged portion 110 (at the right hand side thereof in the figure), intermediate portion 112, and narrow end portion 114. An interior annular shoulder 116 is defined between the intermediate portion 112 and narrow end portion 114. External threads 106 are formed on the narrow end portion 114, and threads 106 engage with internal threads 14 formed in the draw bar 12 (see FIG. 1) to secure the sleeve 100 to the draw bar 12, thereby coupling the assembly 30 to the draw bar 12.

Collet sleeve 100 includes an inner tapered, frusto-conical cam surface 102 formed on the interior of the enlarged head portion 110. Axially extending slots 108 are formed about the outer peripheral surface of the enlarged head portion 110. Although only one such slot 108 is shown in FIGS. 1 and 2, in the preferred embodiment, three equally spaced slots are provided. One of the slots 108 is engaged by a key screw 79 extending through a radial key hole 75 formed in the mount 60 (see FIG. 3C). The key screw 79 engaging one of the slots 108 prevents relative rotation between the collet sleeve 100 and the mount 60.

Sleeve 100 is preferably machined from 8620-C steel, and the entire sleeve is initially hardened to a Rockwell "a" hardness of about 81.8–82.8 (approximately 61–63 on the Rockwell C scale). Subsequently, a rear portion of the sleeve 100 extending from end portion 114 to a location just forward (i.e., to the right in the drawings) of annular shoulder 116 is drawn down to a Rockwell "a" hardness of about 70.4–73.1 (approximately 42–45 on the Rockwell C scale).

As shown in FIGS. 1 and 2, the collet 80 is disposed inside the collet sleeve 100. A collet spring 36 is disposed between an annular end-face 96 of the collet 80 and the interior annular shoulder 116 of the collet sleeve 100. Collet spring 36 is preferably a rectangular wire spring. Collet 80 includes an outer tapered cam surface 82 and a plurality of collet segments 89 separated by slots 90. In the preferred embodiment, three equally spaced collet segments 89 are provided, although one skilled in the art will readily appreciate that more than three segments can be employed. Holes 84 extending radially inwardly from the outwardly tapered surface 82 are drilled into each of the slots 90. The holes 84 receive an elastomeric sealing member (not shown) inserted therein to prevent debris from entering into the machine spindle 10 through the collet slots 90.

The segments 89 contract radially when the collet 80 is closed and expand radially when the collet 80 is opened in response to the camming interaction of the tapered cam surface 82 of the collet 80 and the tapered cam surface 102 of the collet sleeve 100 during relative axial movement of the cam surfaces 82, 102 with respect to each other. A slot relief opening 92 is preferably provided at the axial end of each of the slots 90 to facilitate the radial expansion and contraction of the segments 89.

Collet 80 is preferably machined from 2317 steel, and the entire collet is hardened to a Rockwell C hardness of 61–63. Subsequently, a portion of the collet 80 generally rearwardly (i.e. to the left in the drawings) of the cam surface 82 is drawn down to a Rockwell C hardness of 42–45. The generally softer rear end of the collet 80 facilitates radial contraction of the collet segments 89 during gripping.

An axially extending key-way slot 85 is formed in the outer surface of the collet 80 adjacent the annular rear end-face 96. Key way slot 85 receives a dowel pin 105 extending through a radial opening 104 formed in the collet sleeve 100 to prevent relative rotation between the collet 80 and the collet sleeve 100. Pin 105 is preferably formed from 8620-C steel hardened to a Rockwell C hardness of about 35. The collet 80 may include drilled holes 86 formed in the annular front end-face 94. Although only a single hole 86 is shown in FIGS. 1 and 2, the preferred embodiment includes three equally-spaced holes formed in the annular front end-face 94. Holes 86 accommodate a collet pad clamp (not shown) for a master collet, such as collet 80 shown in FIGS. 1 and 2.

An annular shoulder 98 extends about the periphery of the collet 80. Shoulder 98 is axially displaced from the annular front end face 94 and defines an axial boundary of the outer tapered cam surface 82. Shoulder 98 is preferably beveled at a slight angle of approximately 10 degrees.

As shown in FIGS. 1, 2, and 5A–5D, the quick-change cap 40 includes a radially extending portion 42 and an axially extending portion 44. The outer surface of the axially extending portion 44 may be knurled so as to facilitate the gripping thereof. A circular opening 50 is centrally formed in the radial portion 42 of the quick-change cap 40.

Figure 5C:
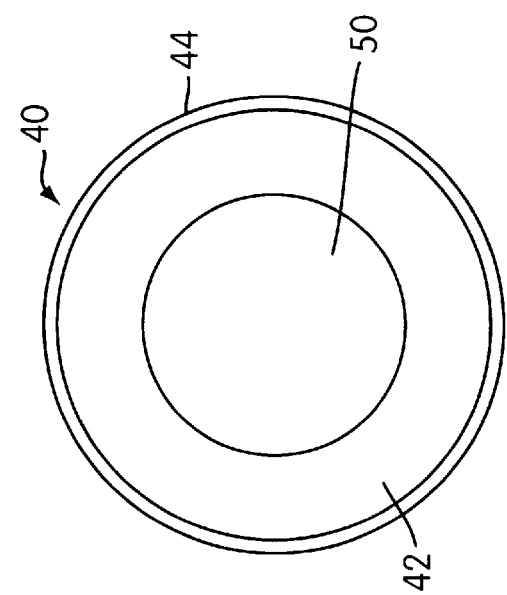
FIGS. 5A, 5B, and 5C are a side cross-sectional view, a bottom plan view, and a top plan view, respectively, of a quick-change cap of the collet chuck assembly.
Figure 5E:
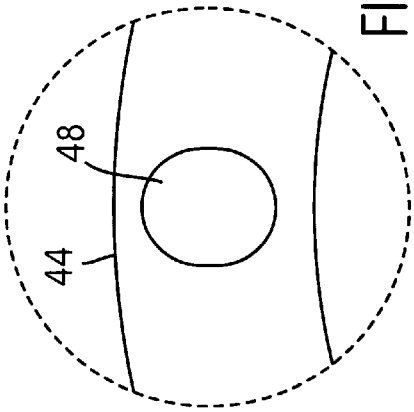
FIG. 5E is an enlarged view of the portion of the quick-change cap within the circle "E" in FIG. 5B.
Figure 5A:
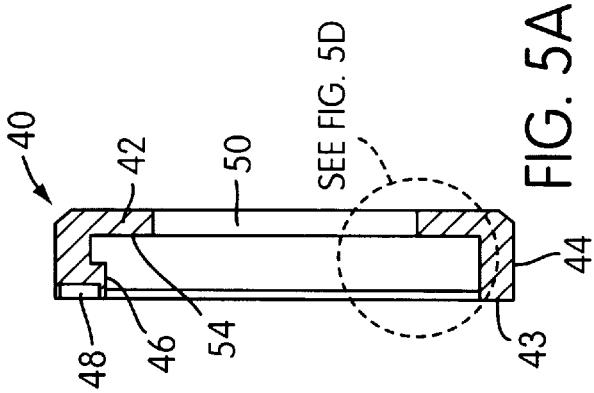
Figure 5B:
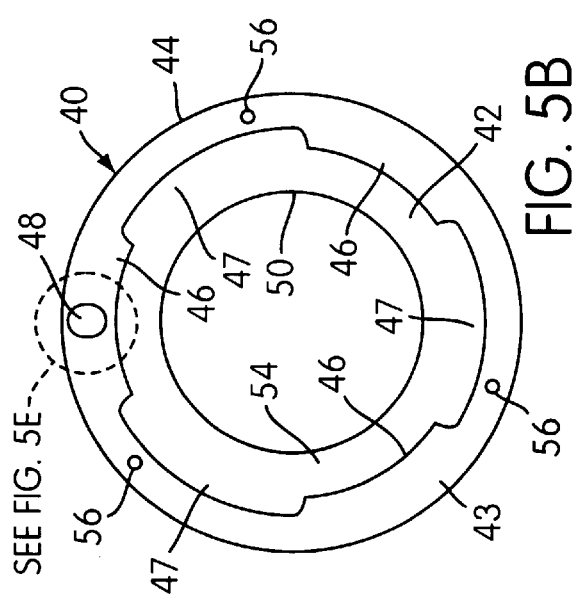
Figure 5D:
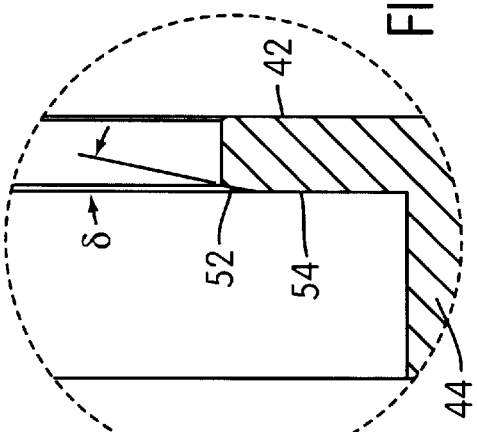
FIG. 5D is an enlarged view of the quick-change cap within the circle "D" in FIG. 5A.

As shown in FIG. 5B, the quick-change cap 40 includes mount-engaging structure, such as lugs 46, extending radially inwardly from the axial end of the axially extending portion 44 of the quick-change cap 40. In the preferred embodiment, three unequally-spaced lugs 46 are provided. The lugs 46 define cut-out areas 47 between adjacent lugs 46. As shown in FIGS. 5A and 5D, the radially extending portion 42 of the cap 40 defines an annular inner face 54 extending about the periphery of the opening 50. Annular inner face 54 includes a beveled surface 52 extending about the edge of the opening 50. Beveled surface 52 is preferably formed at an angle δ, which is approximately 10 degrees.

Cap 40 is preferably machined from 8620-C steel and then hardened to a Rockwell C hardness of about 61.

The assembly 30 is assembled by first threading the collet sleeve 100 to the draw bar 12 and then securing the mount 60 to the spindle 10 with screws 63. The collet sleeve 100 is rotated until one of the slots 108 is aligned with the radial keyhole 75 formed in the mount 60, and key screw 79 is then turned into the keyhole 75 to engage the aligned slot 108. The collet 80 includes a cylindrical extension 99 having an outside diameter slightly smaller than the diameter of the opening 50 of the quick-change cap 40. The collet 80 is coupled to the cap by inserting the cylindrical extension 99 into the opening 50. The quick-change cap 40 is secured to the mount 60 by engagement of the cap-engaging structure of the mount 60 with the mount-engaging structure of the cap 40 when the cap 40 is in a cap-locked position with respect to the mount 60. More particularly, the collet 80 and quick-change cap 40 are coupled to the mount 60 by securing the lugs 46 of the quick-change cap 40 behind the radial flanges 72 of the mount 60 (as will be described in more detail below) while compressing the collet spring 36. The beveled annular shoulder 98 of the collet 80 bears against the beveled surface 52 of the quick-change cap 40, both surfaces having approximately the same beveled angle.

Collet spring 36 urges the collet 80 against the quick-change cap 40 which is held axially immovable by the engagement thereof with the mount 60, thus maintaining the annular front end face 94 in a fixed position with respect to the mount 60. Expansion and contraction of the segments 89 of the collet 80 during opening and closing thereof is effected by relative axial movement of the collet sleeve 100, as actuated by the draw bar 12, with respect to the collet 80, thereby causing relative movement between the tapered cam surfaces 82, 102. Because the collet 80 is held axially fixed while the collet sleeve 100 moves axially with respect to the collet 80, the axial position of the collet 80 does not change regardless of the diameter of the workpiece secured within the collet 80.

The manner in which the quick-change cap 40 is operatively secured to the mount 60 will now be described in detail.

An anti-rotation pin 130 is disposed within the axial aperture 67 formed in the mount 60. Anti-rotation pin 130 generally includes an enlarged portion 132 with a slot 134 formed therein, and an extension portion 136 extending from an end of the enlarged portion 132. Anti-rotation pin 130 is preferably formed from 8620-C steel and is hardened to a Rockwell C hardness of about 61. The anti-rotation pin 130 is inserted into the axial opening 67 with a coil spring 128 disposed at the blind end of the opening 67 and with the extension portion 136 of the anti-rotation pin 130 extended into the spring 128.

Figure 6C:
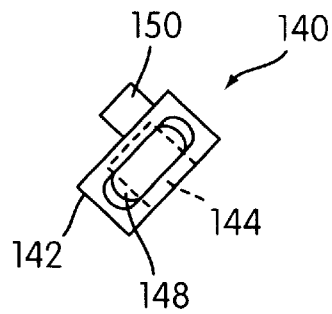
FIGS. 6A, 6B, and 6C are a top plan view, right side elevation, and left side elevation, respectively, of a pin-actuating cam of the collet chuck assembly.
Figure 6A:
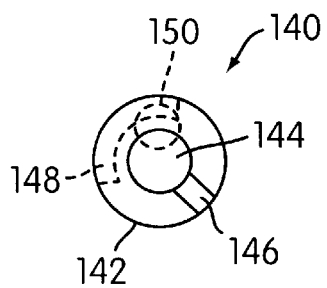
Figure 6B:
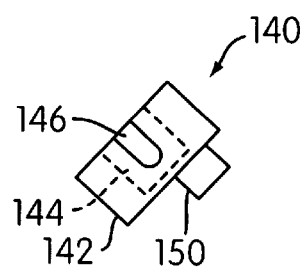

A pin-actuating cam 140 is disposed within the cam aperture 65 formed in the mount 60. As shown in FIGS. 6A–6C, the pin-actuating cam 140 includes a cylindrical main body 142 having a central blind aperture 144 formed therein and a radial slot 146 extending from the aperture 144. An arcuate peripheral slot 148 is formed in an outer surface of the main body 142, and an eccentric protrusion 150 extends from a bottom surface of the cylindrical main body 142.

Pin-actuating cam 140 is preferably formed from 8620-C steel and is hardened to a Rockwell C hardness of about 61.

The pin-actuating cam 140 is placed in the cam aperture 65 of the mount 60 with the eccentric protrusion 150 engaging the slot 134 of the anti-rotation pin 130. A retaining screw 37, having a threaded portion 38 and a non-threaded lead portion 39, is turned into the axial aperture 66 having like threads until the lead portion 39 of retaining screw 37 extends into the arcuate slot 148 formed in the cam 140. Cam 140 is thereby held in the cam aperture 65 by the retaining screw 37 and is permitted to rotate within the cam aperture 65 over the angular extent of the slot 148, which is preferably 90 degrees.

A rotation tool 120, shown in FIG. 4, is provided for use with the collet chuck assembly 30. Rotation tool 120 includes a T-handle 122, a shaft 124, and a radial dowel 126 extending from the end of the shaft 124. Tool 120 is preferably formed from 8620-C steel and is hardened to a Rockwell C hardness of about 35.

The end of the tool 120 is inserted into the cam 140 disposed in the cam opening 65. The diameter of the shaft 124 fits inside the diameter of the central blind aperture 144 formed in the cam 140, and the radial extent of the dowel 126 conforms to the radial extent of the slot 71. Spring 128 urges the anti-rotation pin 130 forwardly in an extended position so as to project past the annular shoulder 73 of the mount 60. The engagement of the slot 134 with the eccentric protrusion 150 of the cam 140 rotates the cam so that, in this biased position, the slot 146 of the cam 140 is aligned with the radial slot 71 of the mount 60. Accordingly, when the tool 120 is inserted into the cam 140, dowel 126 engages the slot 146 of the cam. Tool 120 can then be turned (counter-clockwise in the illustrated embodiment) to rotate the cam 140, thereby retracting the anti-rotation pin 130 into the aperture 68 by the camming action of the eccentric protrusion 150 in the slot 134.

To install the quick-change cap 40 onto the mount 60, the anti-rotation pin 130 is first retracted using the rotation tool 120. Quick-change cap 40 is oriented with respect to mount 60 so that the cutouts 47 between the lugs 46 of the quick-change cap 40 are aligned with the radial flanges 72 of the mount 60. Because the flanges 72 and lugs 46 are asymmetrically arranged about the mount 60 and quick-change cap 40, respectively, the cutouts 47 are aligned with the flanges 72 in only one orientation of the quick-change cap 40 with respect to the mount 60. Quick-change cap 40 is then pressed onto the mount 60 so that the annular end face 43 contacts the annular shoulder 73 of the mount 70, thereby coupling the cap 40 to the mount 60. Dowel 74 protruding into the channel 81 of the mount 60 contacts one of the lugs 46 of the quick-change cap 40, thereby providing a hard stop which permits rotation of the quick-change cap 40 with respect to the mount 60 in only one direction, thereby ensuring that pin 130 and hole 48 are oriented in mating positions.

Cap 40 is rotated a portion of a single revolution with respect to the mount 60 until an anti-rotation hole 48 is aligned with the anti-rotation pin 130. In this cap-locked position, the lugs 46 of the cap 40 are behind the flanges 72 of the mount 60, thereby preventing axial displacement of the cap 40 with respect to the mount 60. As shown in FIG. 5E, anti-rotation hole 48 is preferably slightly elongated in the radial direction so as to compensate for slight misalignments between the hole 48 and the anti-rotation pin 130. As shown in FIG. 3C, spring biased plungers 83 are preferably installed in drilled and tapped holes formed in the annular shoulder 73 of the mount 60. In the preferred embodiment, three equally spaced plungers 83 are provided. Plungers 83 engage mating detents 56 formed in the annular end face 43 of the quick-change cap 40 (see FIG. 5B) to assist in aligning the anti-rotation hole 48 with the anti-rotation pin 130.

The tool 120 is then rotated (clockwise in the illustrated embodiment) to permit the spring 128 to urge the anti-rotation pin 130 into engagement with the anti-rotation hole 148 to link the cap 40 to the mount 60, thereby preventing rotation of the cap 40 with respect to the mount 60. A spring plunger 78 inserted into the tangential aperture 68 of the mount 60 engages a detent 138 formed in the side of the anti-rotation pin 130 to assist in holding the anti-rotation pin 130 in the extended position. With the tool 120 thus rotated, dowel 126 is again aligned with slot 71 formed in the mount 60 so that the tool may be removed from the cam 140. Note that because of the arrangement of the radial slot 71 and the arcuate slot 69 of the mount 60, the tool 120 cannot be retracted from the pin-actuating cam 140 until the cam rotates to a position in which the anti-rotation pin 130 is extended to engage the anti-rotation hole 48 of the quick-change cap 40.

While the anti-rotation cam 140 operated by the tool 120 constitutes a preferred pin-actuating mechanism for moving the anti-rotation pin 130 between extended and retracted positions, other mechanisms for effecting movement of the pin 130 may be used as well. For example a linearly sliding pin-actuating mechanism can be installed in an outer wall of the mount and coupled to the anti-rotation pin 130 so that sliding movement of the mechanism will cause corresponding movement of the pin 130. It is especially preferred, however, that the pin actuating mechanism be constructed and arranged so that a tool for moving the mechanism and causing corresponding movement of the pin 130 can only be disengaged from the mechanism when the pin is in the extended position. This provides a safety check to the user so that the tool is not disengaged from the pin-actuating mechanism before the pin 130 has extended into the aperture 48 of the cap 40 and thereby locked the cap 40 with respect to the mount 60.

Thus, it can be appreciated that the collet 80 can be installed by simply inserting it into the sleeve 100 and installing the cap 40 in the simple manner described above. Removing the collet 80 is equally simplified. The sleeve 100 is engaged with the draw bar 12 and need not be disengaged every time the collet 80 is removed. Accordingly, the collet 80 need not be disengaged from the draw bar when removed or engaged with the draw bar when installed.

Figure 7:
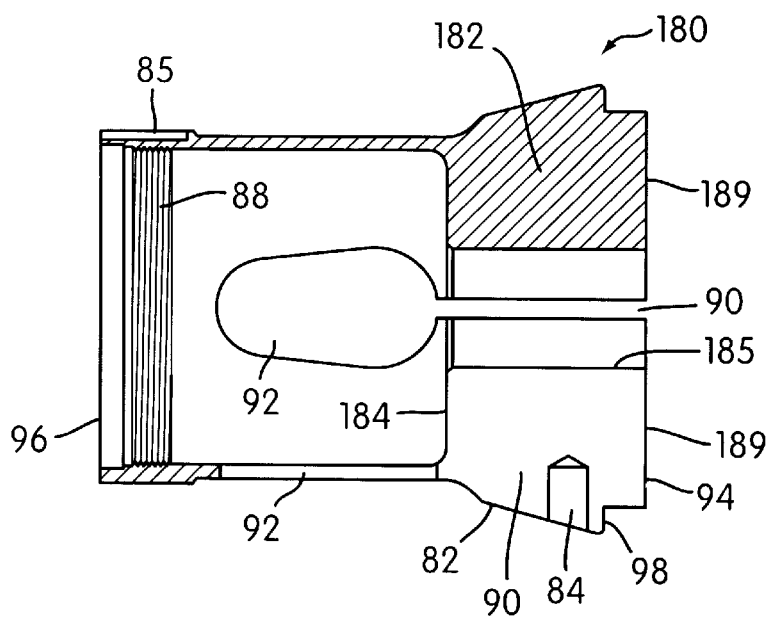
FIG. 7 is a cross-sectional view of an alternative collet used in conjunction with the collet chuck assembly.

An alternate collet 180 for use with the assembly of the present invention is shown in FIG. 7 in which features that are common to the collet 80 shown in FIGS. 1 and 2 have corresponding reference numbers. Collet 180 is a solid collet having segments 189 with solid portions 182 defining an axial opening 185 therethrough. Solid portions 182 define aback annular edge 184. Solid collet 180 can be custom bored by the end user to accommodate a particular size of tool or workpiece. Accordingly, collet 180 does not require collet pads and therefore a collet pad clamp and the corresponding openings 86 shown on the master collet 80 are not necessary for the solid collet 180.

Solid collet 180 is preferably machined from the same material and given the same heat treatment as collet 80 described above.

Figure 8:
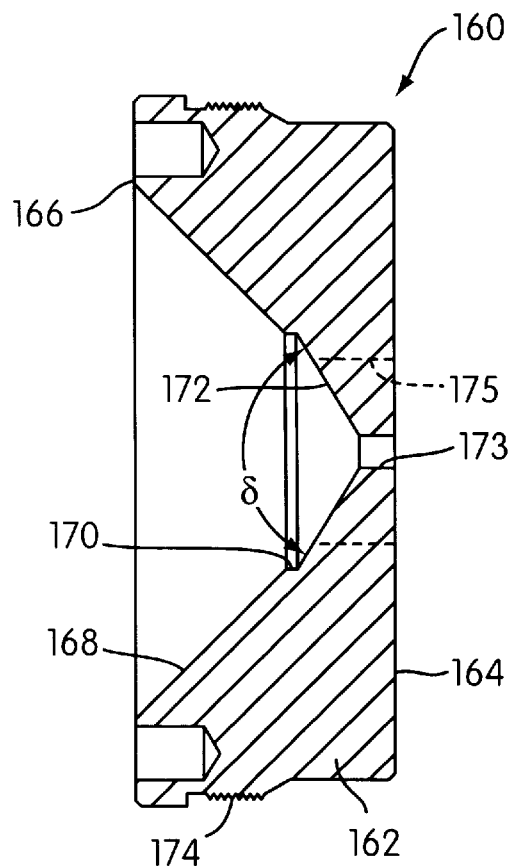
FIG. 8 is a side elevation of a solid stop assembly optionally used in conjunction with the collet chuck assembly.

An optional feature which may be advantageously employed with the collet assembly 30 of the present invention is a rear guide bushing 160 shown in FIG. 8. Bushing 160 includes a body 162 with a first end face 164 and a second end face 166. A first conical section 168 and a second conical section 172, separated by a cylindrical section 170, are formed so as to extend from the second end face 166. First and second conical sections 168, 172 are preferably formed at an angle $\gamma$ of approximately 132 degrees. A through hole 173 is formed centrally through the second conical section 172 to the first end face 164. The rear guide bushing 160 can be installed into a rear end of a collet 80 (180) by turning external threads 174 formed in the outer surface of the body 162 into internal threads 88 formed on the interior of the collet 80 (180). A custom-sized through hole, indicated by phantom lines 176, can be formed centrally through the rear guide bushing 160 by an end user. The rear guide bushing 160 facilitates alignment of elongated bar stock inserted from the rear of a machine, such as a lathe, with the collet 80 (180). With a solid collet 180 or with collet pads installed in a master collet 80, alignment of the bar stock with the collet opening, such as collet opening 185 formed in solid collet 180, can be difficult without the benefit of the rear guide bushing 160.

Bushing 160 is preferably formed from 8620-C steel and is hardened to a Rockwell C hardness of about 35.

Figure 9:
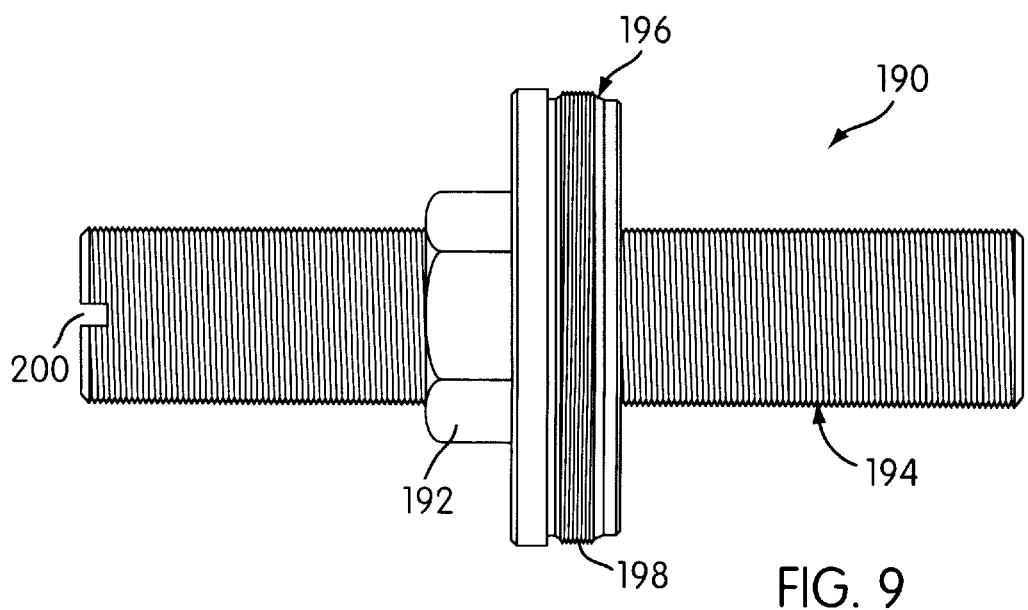
FIG. 9 is a cross-sectional view of a rear guide bushing optionally used in conjunction with the collet chuck assembly.

Another optional feature that can be advantageously used in conjunction with the collet assembly of the present invention is a solid stop assembly 190, as shown in FIG. 9. The solid stop assembly 190 includes a solid stop body 196 having external threads 198 formed on the outer periphery thereof and a centrally formed threaded aperture that is engaged by a threaded stop rod 194. Solid stop body 196 is preferably formed from steel and is hardened to a Rockwell C hardness of about 35. A nut 192 secures the stop rod 194 with respect to the body 196. A slot 200 may be formed in one end of the stop rod 194 to facilitate adjustment of the rod 194 with a tool such as a screwdriver. Solid stop assembly 190 can be secured to a collet 80 (180) by turning the external threads 198 of the body 196 into the internal threads 88 of the collet 80 (180). With the solid stop assembly installed in a collet 80 (180), the stop rod 194 limits the extent to which a workpiece can be inserted into the collet 80 (180), thereby permitting repeatable positioning of the workpiece in the collet. The construction, function, and operation of the solid stop assembly is similar to a solid stop assembly disclosed in U.S. Pat. No. 5,330,224, the disclosure of which is hereby incorporated by reference.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

Furthermore, it should be noted that where the appended claims do not include language in the 'means for performing a specified function' format permitted under 35 U.S.C. §112(¶6), it is intended that the appended claims not be interpreted under 35 U.S.C. §112(¶6) as being limited to the structure, material, or acts described in the present specification and their equivalents.

What is claimed is:

1. A collet chuck assembly for holding a tool or workpiece on a spindle of a turning machine, said collet chuck assembly comprising:

a mount having a front end and a rear end adapted to be connected to the spindle and further including cap engaging structure adjacent said front end, said mount having an axial opening extending therethrough;

a collet assembly disposed within said axial opening of said mount and including a tubular collet structure having a front end and a rear end for holding a tool or workpiece, said collet assembly having operatively interacting cam surfaces and being constructed and arranged to permit relative movement between said cam surfaces whereby relative movement between said cam surfaces in one direction closes said collet structure to hold the tool or workpiece and relative movement between said cam surfaces in an opposite direction opens said collet structure to release the tool or workpiece;

an annular cap secured to said front end of said mount and engaging said front end of the collet structure to maintain said front end at a fixed axial position with respect to said cap and said mount during the relative movement between the cam surfaces of the collet assembly in the one direction or the other direction, said cap including mount-engaging structure constructed and arranged to coact with said cap engaging structure of said mount to prevent relative axial displacement between said cap and said mount when said cap is in a cap-locked position with respect to said mount, said cap being placed in said caplocked position by coupling said cap to said mount with said mount-engaging structure of said cap disengaged from said cap-engaging structure of said mount and then rotating said cap less than one revolution with respect to said mount to interengage said mount-engaging structure of said cap with said cap-engaging structure of said mount; and a cap anti-rotation mechanism located within said mount and constructed and arranged to releasably link said cap to said mount to prevent relative rotation between said cap and said mount in two relative rotational directions after said cap has been rotated into said cap-locked position with respect to said mount.

2. The collet chuck assembly of claim 1, wherein said collet assembly comprises a tubular collet sleeve having a front end and a rear end and adapted to be connected at said rear end to a displacing mechanism of the turning machine for effecting axial movement of said collet sleeve, said collet sleeve being disposed within said axial opening of said mount for axial movement with respect to said mount, said collet sleeve including an inner tapered cam surface adjacent said front end thereof.

3. The collet chuck assembly of claim 2, said collet structure of said collet assembly comprising two or more collet segments adjacent said front end thereof and separated by axially-extending slots and an outer tapered cam surface adjacent said front end and extending about an exterior portion of said collet segments, wherein said collet structure is disposed interiorly of said collet sleeve with said outer cam surface of said collet structure engaged in sliding contact with said inner cam surface of said collet sleeve, said collet segments being constructed and arranged to be elastically contracted in a radial direction to close said collet structure to hold the tool or workpiece between the collet segments upon axial movement of said collet sleeve with respect to said collet structure.

4. The collet chuck assembly of claim 3, said collet assembly further comprising a collet spring disposed between an interior annular shoulder formed inside said collet sleeve and the rear end of said collet structure.

5. The collet chuck assembly of claim 2, wherein said collet sleeve includes an axial pin extending from an inner surface thereof and said collet structure includes an axial slot formed in an outer surface thereof, wherein said pin is received within said axial slot to prevent rotation of said collet structure with respect to said collet sleeve.

6. The collet chuck assembly of claim 2, further comprising a key screw extending radially through an outer wall of said mount and engaging an axial slot formed in an outer surface of said collet sleeve to prevent rotation of said collet sleeve with respect to said mount.

7. The collet chuck assembly of claim 1, wherein said cap-engaging structure of said mount comprises a plurality of angularly-spaced flanges extending radially outwardly from an outer surface of said mount adjacent said front end thereof, and wherein said cap includes an axial portion having a front end and a rear end and an annular radial portion adjacent said front end defining an opening through said cap, said mount engaging structure comprising a plurality of angularly-spaced lugs extending radially inwardly from an inner surface of said axial portion adjacent said rear end thereof.

8. The collet chuck assembly of claim 1, further comprising a rear guide bushing having a first end face, a second end face, an inner conical surface extending from said second end face, and a through hole extending from said inner conical surface to said first end face, said rear guide bushing being constructed and arranged to be coupled to said collet assembly for aligning a workpiece with said collet structure.

9. The collet chuck assembly of claim 1, further comprising a solid stop assembly comprising a solid stop body and a stop rod extending axially through said solid stop body, the distance between each end of said stop rod and said solid stop body being adjustable, said solid stop assembly being constructed and arranged to be coupled to said collet assembly for limiting the extent to which a workpiece is inserted into said collet assembly.

10. The collet chuck assembly for holding a tool or workpiece on a spindle of a turning machine, said collet chuck assembly comprising:

a mount having a front end and a rear end adapted to be connected to the spindle and further including cap engaging structure adjacent said front end, said mount having an axial opening extending therethrough;

a collet assembly disposed within said axial opening of said mount and including a tubular collet structure having a front end and a rear end for holding a tool or workpiece, said collet assembly having operatively interacting cam surfaces and being constructed and arranged to permit relative movement between said cam surfaces whereby relative movement between said cam surfaces in one direction closes said collet structure to hold the tool or workpiece and relative movement between said cam surfaces in an opposite direction opens said collet structure to release the tool or workpiece;

an annular cap secured to said front end of said mount and engaging said front end of the collet structure to maintain said front end at a fixed axial position with respect to said cap and said mount during the relative movement between the cam surfaces of the collet assembly in the one direction or the other direction, said cap including mount-engaging structure constructed and arranged to coact with said cap engaging structure of said mount to prevent relative axial displacement between said cap and said mount when said cap is in a cap-locked position with respect to said mount, said cap being placed in said caplocked position by coupling said cap to said mount with said mount-engaging structure of said cap disengaged from cap-engaging structure of said mount and then rotating said cap less than one revolution with respect to said mount to interengage said mount-engaging structure of said cap with said cap-engaging structure of said mount;

a cap anti-rotation mechanism located within said mount and constructed and arranged to releasably link said cap to said mount to prevent relative rotation between said cap and said mount after said cap has been rotated into said cap-locked position with respect to said mount;

wherein said cap anti-rotation mechanism comprises:

an anti-rotation pin carried in an axial aperture formed in said mount for axial movement between an extended position in which an end of said anti-rotation pin extends from said aperture at said front end of said mount and a retracted position in which the end of said anti-rotation pin is retracted into said aperture, the end of said anti-rotation pin engaging an anti-rotation aperture formed in said cap when said cap is in said cap-locked position and said anti-rotation pin is in said extended position to prevent relative rotation between said cap and said mount; and a pin actuating mechanism carried by said mount for movement in opposite directions and operatively coupled to said anti-rotation pin so that movement of said pin actuating mechanism in either of said opposite directions causes corresponding movement of said anti-rotation pin between said extended and retracted positions.

11. The collet chuck assembly of claim 10 further comprising a coil spring coaxially arranged with said anti-rotation pin to bias said anti-rotation pin into said extended position.

12. The collet chuck assembly of claim 10, wherein said pin actuating mechanism is constructed and arranged to be engaged by a manually operated tool for manually moving said pin actuating mechanism from a first position corresponding to an extended position of said anti-rotation pin to a second position corresponding to a retracted position of said anti-rotation pin and to prevent the tool from being disengaged therefrom only when said pin actuating mechanism is in said first position.

13. The collet chuck assembly of claim 10, wherein said pin actuating mechanism is disposed in a radial aperture formed in an outer wall of said mount, said radial aperture extending to said axial aperture formed in said mount, and wherein said pin actuating mechanism comprises a pin-actuating cam having a cylindrical body with a top surface, a bottom surface, an outer surface, and an eccentric pin extending from said bottom surface, wherein said eccentric pin of said pin actuating cam engages a transverse slot formed in said anti-rotation pin so that rotation of said cylindrical body within said radial aperture and associated eccentric rotation of said eccentric pin causes corresponding reciprocal axial movement of said anti-rotation pin within said axial aperture.

14. The collet chuck assembly of claim 13, wherein said anti-rotation mechanism further comprises a retaining screw extending axially into said mount from said rear end thereof and including a projection extending into said radial aperture and wherein said pin actuating cam further includes an arcuate slot formed about a portion of said outer surface of said cylindrical body, said projection of said retaining pin extending into said arcuate slot to retain said pin actuating cam within said radial aperture and to limit the extent of rotation of said cylindrical body within said radial aperture.

\* \* \* \* \*